United States Patent [19]
Rosenberg

[11] 3,857,227
[45] Dec. 31, 1974

[54] CUTTER HEAD FOR PICKING FRUIT
[76] Inventor: Baruch Rosenberg, 4 Hadekalim St., Hod Hasharon, Israel
[22] Filed: Jan. 31, 1974
[21] Appl. No.: 438,409

[30] Foreign Application Priority Data
Jan. 31, 1973 Israel.................................. 41435

[52] U.S. Cl. .................................. 56/335
[51] Int. Cl............................................ A01g 19/08
[58] Field of Search ............................... 56/332–340

[56] References Cited
UNITED STATES PATENTS
| | | | |
|---|---|---|---|
| 1,152,331 | 8/1915 | Mahoney.............................. | 56/335 |
| 1,191,954 | 7/1916 | Elkins.................................. | 56/336 |
| 2,900,780 | 8/1959 | Kaiser.................................. | 56/339 |

FOREIGN PATENTS OR APPLICATIONS
| | | | |
|---|---|---|---|
| 132,737 | 4/1933 | Austria................................. | 56/335 |

*Primary Examiner*—Russell R. Kinsey
*Attorney, Agent, or Firm*—Browdy and Neimark

[57] ABSTRACT

A cutter head for picking fruit growing on a tree has a base plate adapted to be supported on one end of an elongated rod and a guide slot that opens at the unsupported end of the plate for receiving the stem of a piece of fruit growing on a tree. Means are provided for urging a stem in the slot toward the crotch thereof and a cutter, mounted on the plate, has a pair of cutter bars positioned adjacent the crotch of the slot. A selectively operable cutter actuating mechanism is also provided for imparting relative movement to the cutter bars thereby severing a stem captured in the crotch.

11 Claims, 10 Drawing Figures

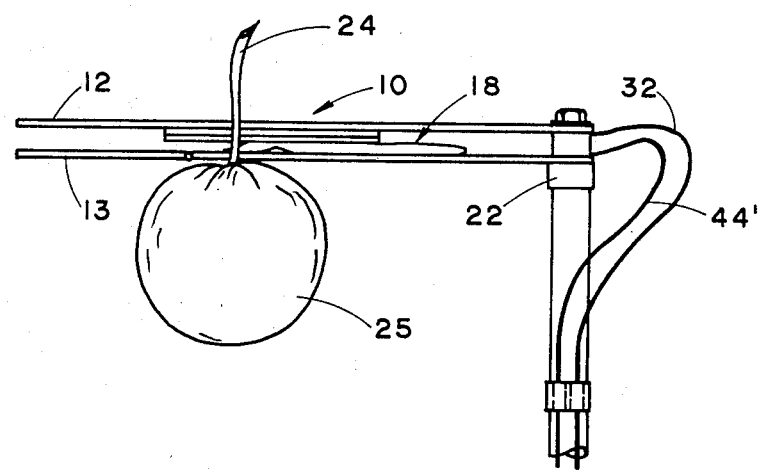
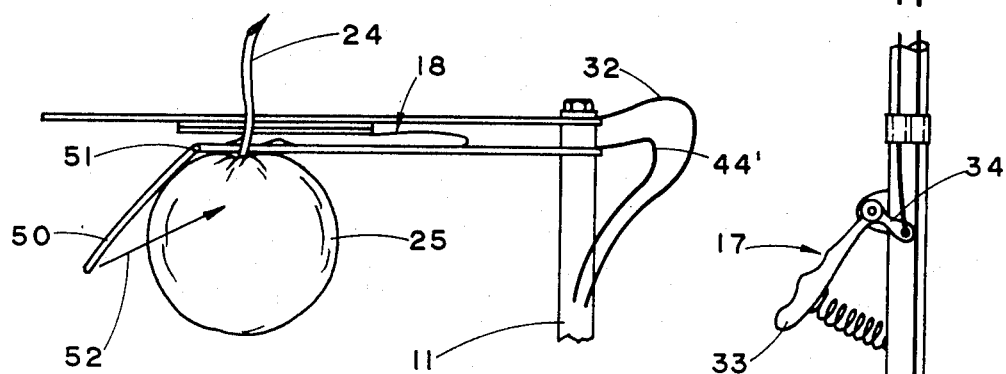
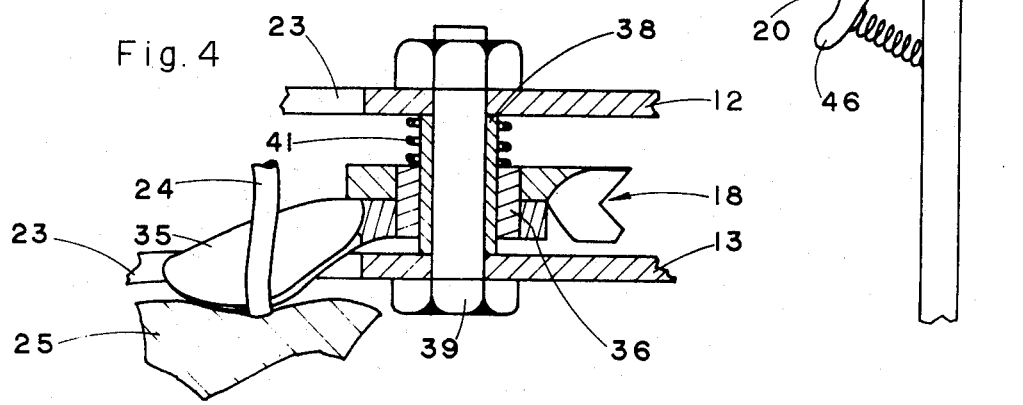

CUTTER HEAD FOR PICKING FRUIT

This invention relates to apparatus for picking fruit growing on trees, and more particularly to apparatus that facilitates severing the stem at a point close to the body of the fruit.

There are many advantages that accrue by reason of picking fruit from trees such that the stem is severed adjacent the body of the fruit. In order to achieve this result, it has been the practice heretofore, to pick fruit piece by piece, by manually severing the stem of a piece of fruit either by twisting it between the fingers of opposite hands, or by cutting it with a special cutter designed to permit the cutter blades to be positioned close to the body of the fruit. This approach permits the picking of only that fruit which can be reached by hand from the ground or from special ladders leaving fruit not easily accessible remaining on the trees. As a consequence of the manual work involved, the harvesting of fruit is a tedious, time-consuming operation expensive in terms of the labour involved, as well as crop damage by reason of improper picking techniques.

It is therefore an object of the present invention to provide a new and improved apparatus for picking fruit growing on trees which will facilitate the picking process and reduce crop damage by reason of improper picking techniques.

According to the present invention, there is provided a cutter head for picking fruit growing on a tree comprising a base plate adapted to be supported on one end of an elongated rod and a base plate having a guide slot that opens at the unsupported end of the plate and is adapted to receive the stem of a piece of fruit growing on a tree, a pair of cooperable pusher fingers movably mounted on the plate on each side of the slot, a selectively operable finger actuating mechanism for simultaneously moving the fingers toward the crotch of the slot thereby pushing a stem originally located near the open end of the slot toward the crotch where the stem is captured, a cutter mounted on the plate having a pair of cutter bars positionable in the crotch of the slot, and a selectively operable stem cutter actuating mechanism for moving the cutter bars together thereby severing a stem captured in the crotch.

When the cutter head is attached to an elongated rod, a user standing on the ground may manoeuvre the cutter head into a position adjacent a piece of fruit growing anywhere on the tree, such that the stem of the fruit enters the open end of the guide slot. When this occurs, the user may operate the finger actuating mechanism by means of an operating lever mounted on the rod for the purpose of moving the fingers of the cutter head such that they engage the stem from behind and push it toward the crotch of the slot where the stem is operatively positioned with respect to the cutter bars. Now, the user may actuate the stem cutter mechanism mounted on the rod thereby severing the stem of the fruit. By applying a downwardly directed force on the cutter head just prior to operating the stem cutter mechanism, the cutter bars will be positioned in contact with the body of the piece of fruit thus positioning the cutter bars close to the body of the fruit just prior to severing the stem. Because the cutter head is mounted on one end of an elongated rod, a user will generally find that all of the fruit on a tree is accessible to him from the ground avoiding the necessity for using special ladders which may damage the tree and which may be dangerous to the picker, and giving rise to the possibility, for the first time, of gleaning a tree.

In order to sever the stem as close to the body of the fruit as possible, it is preferred to locate the cutter bars above the base plate such that the cutter bars project into and through the slot extending beyond the plane of the base plate. In such arrangement, it is preferred for the cutter to have limited displacement relative to the plate so that the cutter bars may move into and out of the slot to accommodate fruit having depressions of different depths surrounding the location where the stem is attached to the fruit. In such case, it is preferred for the cutter bars to be spring urged into the slot.

Embodiments of the invention are illustrated by way of example in the accompanying drawings, wherein:

FIG. 1 is a side view of a cutter head according to one embodiment of the present invention mounted on one end of an elongated rod and shown in a position for severing the stem of a piece of fruit;

FIG. 4 is an enlarged sectional view of the pivotal connection between the cutter bars of the cutter;

FIG. 5 is a modified version of the first embodiment showing an auxiliary flap for assisting in properly positioning the fruit prior to severing the stem;

Figure 2:
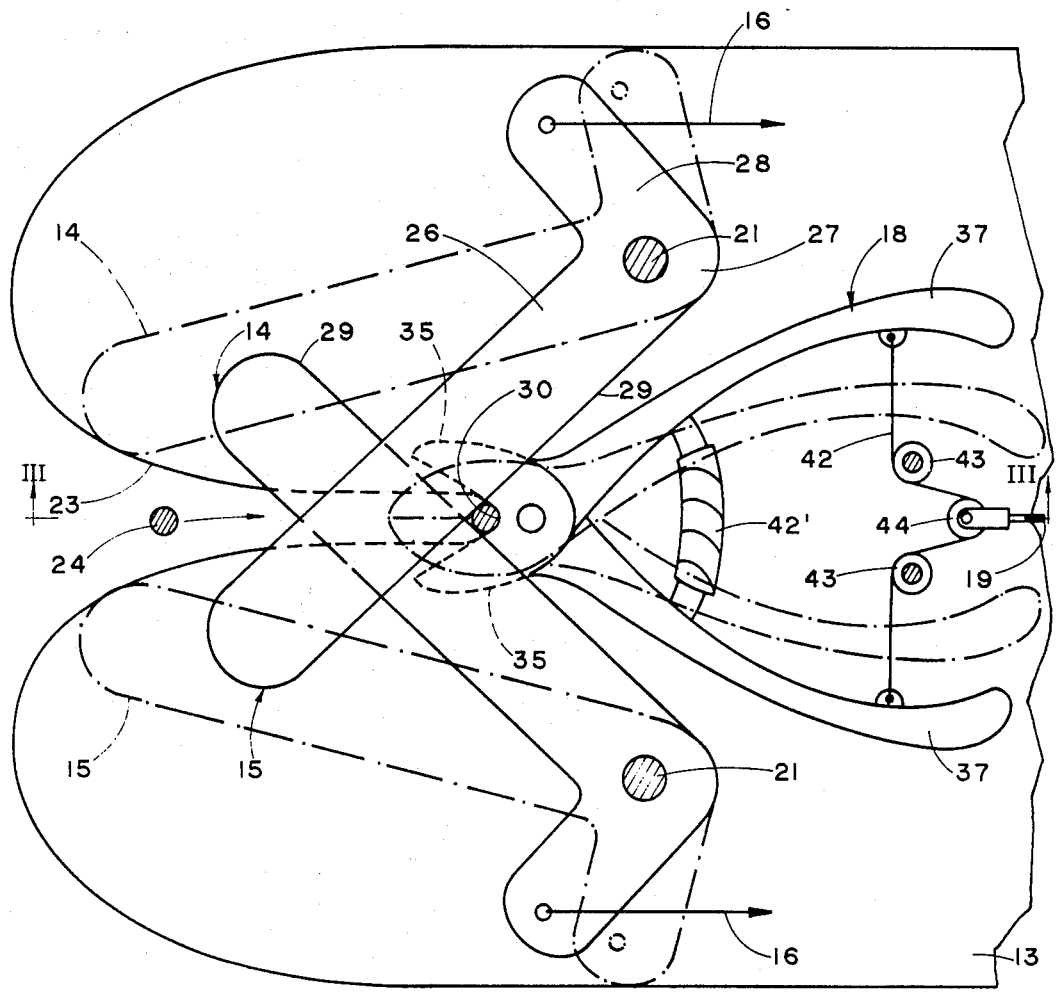
FIG. 2 is an enlarged top view of the base plate showing the pair of pusher fingers and the cutter mounted thereon.

Referring now to FIG. 1, reference numeral 10 designates a cutter according to the present invention supported on one end of an elongated rod 11 constructed of wood or of metal tubing of a size suitable for being grasped in the hands of a person picking fruit. Cutter head 10 comprises a pair of overlying plates 12 and 13 (see FIG. 3), a pair of cooperable pusher fingers 14 and 15 (see FIG. 2), connecting links 16 of a selectively operable finger actuating mechanism 17 (see FIG. 1), a cutter 18, and a linkage 19 of a selectively operable stem cutter actuating mechanism 20 (see FIG. 1).

Top or cover plate 12 is held in spaced, overlying relationship to the bottom or base plate 13 by means of a pair of spacer pins 21 and by a spacer bar (not shown) at the end of the plate adjacent the bottom opening socket 22 into which the rod 11 is received for attaching the cutter head to the rod. Each of plates 12 and 13 is provided with an elongated guide slot 23 that opens at the unsupported ends of the plates and which is adapted to receive the stem shown schematically by reference numeral 24 in FIG. 2 on a piece of growing fruit indicated schematically by reference numeral 25 in FIG. 1.

Each of fingers 14 and 15 is flat and includes a longer leg 26 connected by a knee portion 27 to a shorter orthogonal leg 28. The knee portion 27 of each leg defines a pivot connection for respective ones of the pins 21 such that the longer leg 26 of each of the fingers can move from a first position at which its free end clears the slot allowing entry thereinto of a stem, to a second position at which the leg 26 crosses the slot and positions the leading edge 29 thereof adjacent the crotch 30 of the slot. The first position of the fingers is shown in the phantom lines of FIG. 2 while the second position of the fingers is shown in the full lines of FIG. 2.

Movement of the fingers between the first and second positions is effected by means of the flexible link 16 which may extend through a flexible sheath 32 (see FIG. 1) and terminate on a leg 34 angularly extending from a hand grip 33 pivoted to the rod 11 and defining a portion of the selectively operable finger actuating mechanism 17. A spring interposed between the grip 33 and the rod 11 positions the grip 33 such that the flexible links 16 hold the fingers in their first position, i.e., the position at which the free ends of the fingers clear the slot 23.

The cutter 18 comprises a pair of cutter bars 35 pivotally connected together by bushing 36 (see FIG. 4), and a pair of operating arms 37 integrally connected with respective ones of the cutter bars 35. Preferably, cutter 18 is a standard fruit cutter in which the cutter bars 35 are curved outwardly beyond the plane of movement of the operating arms as shown in FIG. 4.

Figure 3:
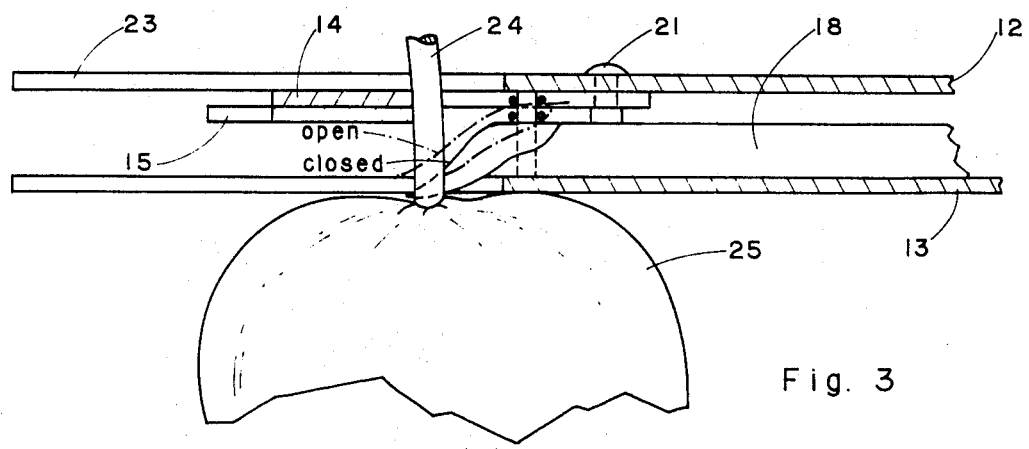
FIG. 3 is a sectional view taken along the lines III—III of FIG. 2.

The mounting of the cutter on the base plate includes a spacer sleeve 38 extending between the plates 12 and 13 and held in place by bolt 39. The bushing 36 is slidably mounted on sleeve 38 so that the cutter has limited axial movement on sleeve 38 permitting the cutter bars 35 to be displaced into and out of the slot 23 in the bottom plate 13. In this manner, the cutter bars 35 can be disposed in contact with the body of the fruit 25 as shown in FIG. 4 regardless of the depth of the depression in the region where the stem 24 is attached to the fruit. A compression spring 41 interposed between the top plate 12 and the cutter 18 resiliently urges the latter toward plate 13 so that cutter bars 35 normally project through the slot 23 as shown in FIG. 3.

On the side of the bushing 36 opposite to the cutter bars 35 and located on the legs 37 therebetween is a spring 42' which urges the legs of the cutter apart and holds the cutter bars separated so that the normal position of the cutter is as shown in FIG. 2. The spacing of bolt 39 relative to slot 23 is such that the apex between the cutter bars 35 is located precisely at the crotch 30 of the slot.

Attached to each of the legs 37 of the cutter adjacent the free end thereof is a flexible cable 42 which passes over a pair of pulleys 43 and into engagement around a movable take-up pulley 44 for the purpose of simultaneously moving the legs 37 together when the flexible cable 19 is moved in the direction of the arrow shown in FIG. 2. Cable 19 passes through a flexible sheath 44' and terminates on extension 45 which is integrally formed with a hand grip 46 pivotally mounted to the rod 11 as shown in FIG. 1. Hand grip 46 and the extension 45 attached thereto constitutes a portion of a selectively operable stem cutter actuating mechanism by which the cutter bars may be moved together. A spring interposed between the hand grip 46 and the rod 11 may be utilized for the purpose of properly positioning the hand grip 46 such that the cutter bars 35 are normally open as shown in FIG. 2 in the event that spring 42' is not utilized.

In operation, a user desiring to pick fruit growing on a tree would stand on the ground grasping the rod 11 in both hands so that the cutter head 10 is positioned near the particular piece of fruit to be picked. The length of the rod 11 is such that the user may reach to the topmost region of a tree as well as to regions in the centre portion of the tree as well as around the peripheral regions. Having selected the piece of fruit which is desired to be picked, the user would maneuvre the cutter head 10, whose plates 12 and 13 would be horizontally disposed, until the stem of the fruit enters the open end of slot 23 of the cutter head 10 as shown in FIG. 2. In such position, the leading edges 29 on each of the fingers 14 and 15 will be behind the stem 24 so that the user may grasp the hand grip 33 squeezing the same and moving the flexible links 16 such that the fingers 14 and 15 pivot from their first position to their second position. During such pivotal movement, the leading edges of the fingers engage the stem 24 from behind moving it toward the crotch 30 where the stem is captured between the closed end of the slot 23 and the crossed leading edges 29 of the fingers.

Slight downward pressure applied by the user to the rod 11 will move the bottom plate 13 downwardly until the bottom plate engages the top of the piece of fruit. The cutter bars 35 being spread apart, will be raised out of the slot 23, but upon being closed, the cutter bars will move downwardly under the influence of spring 41, entering slot 43 and engaging the region of the fruit surrounding its connection to the stem 24. The user now manually grasps the grip 46 and squeezes the same for causing the flexible link 19 to move in the direction indicated by the arrow in FIG. 2 thus closing the legs 37 and causing the cutter bars 35 to move toward each other severing the stem close to the body of the fruit and detaching the fruit from the tree. A chute (not shown) may be attached to the bottom plate 13 for the purpose of collecting pieces of fruit as they are severed from the tree.

From the above description, it can be seen that the cutter head of the present invention facilitates the picking process because all of the fruit on a tree is accessible from the ground. The cutter of the present invention will also reduce crop damage by reason of improper picking techniques because it will permit the stems of the fruit to be severed close to the body of the fruit.

To facilitate the entry of a stem into the slot 23, the plates 12 and 13 at their unsupported ends may be curved upwardly as shown in FIG. 1. Alternatively, the top plate 12 may be dispensed with although the top plate forms a cover which protects the fingers and the cutter. It is also possible to mount the cutter below the plate 13 rather than on top of the plate. In addition, the cutter may be made movable on the cover plates in a manner different from that shown in FIG. 4. For example, the cutter may be pivotally mounted on the bottom plate. Finally, slot 23 may be made adjustable in width by providing a pair of laterally adjustable bars on the plate 13. In this way, stems of different thickness can be accommodated permitting the same head to be used for different types of fruit by adjusting the slot width and changing the chute size.

In order to assist or even replace the fingers in moving the fruit such that the stem is positioned in the crotch 30 of slot 23, a finger or flap 50 may be pivotally connected by hinge 51 on the unsupported end of the base plate 13 on each side of slot 23. A flexible link 52 operatively connects the flaps 50 to the actuating mechanism 17 such that the flaps are moved downwardly in response to actuation of mechanism 17. If fingers 14 and 15 are used, movement of flaps 50 is synchronized with the movement of the fingers from their first to their second position. This has the effect of causing flaps 50 to push from behind against the body of a piece of fruit and assist the fingers in moving the stem 24 into the crotch 30 of the slot. This modification is valuable in situations where there are branches and leaves which would interfere with the free movement of the stem 24 in slot 23.

Figure 6:
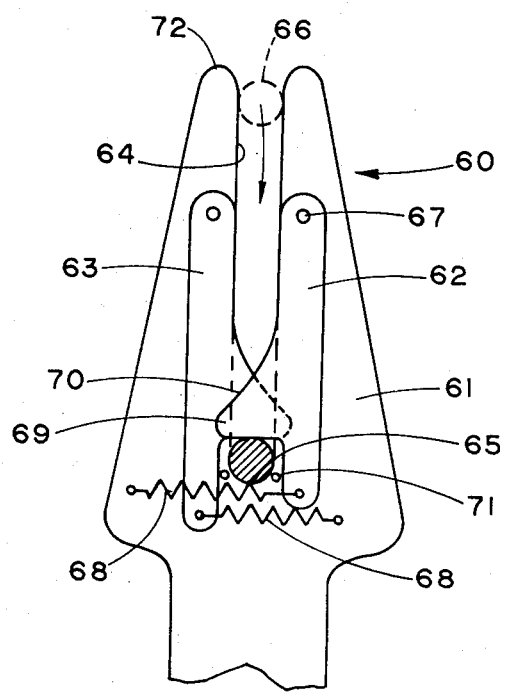
FIG. 6 is a top view of a second embodiment of the invention in which the fingers holding the fruit in proper position are spring biased and operate automatically.

In order to simplify construction of the head, by eliminating the manually operable actuating means 17, the modified head 60 shown in FIG. 6 can be utilized. Head 60 comprises a top cover plate 61 attached to a rod (not shown), a pair of latch plates in the form of fingers 62, 63 and a cutter mechanism (not shown) similar to cutter mechanism 18 of the previous embodiment. Cover 61 has an elongated slot 64 terminating in a crotch 65 adapted to receive a stem 66 of a piece of fruit growing on a tree. The cutter bars of the cutter mechanism are located in crotch 65.

Each of latch plates 62, 63 is pivoted by a pin 67 to the cover 61 on opposite sides of the slot 64, and extends in a direction toward the crotch terminating in a free end to which one end of a spring 68 is attached. The other end of each spring is attached to the cover so that the latch plates 62, 63 are spring-biased toward each other. Each of the latch plates is also provided with a nose 69 that normally projects into the slot 64. Each nose has a sloping cam surface 70 adapted to engage a stem when the latter is moved in the notch relative to the head for the purpose of pivoting latch plates 62, 63 on their pins 67 to clear the way for the stem to enter crotch 65. Stop pins 71 attached to the cover plate and engageable with the free ends of the latch plates limit the movement thereof toward each other.

In operation, a user would hoist the head 60 into a tree bearing fruit and guide the pointed end 72 of the head toward a piece of fruit that is to be picked causing the stem thereof to enter slot 64. Continued transverse movement of the head by the user relative to the fruit attached to the tree will cause the stem to enter further into the slot 64 until the cam surfaces 70 of the latch plates 62, 63 are engaged. Continued movement of the head 60 will cause the latch plates to be cammed apart and the stem to enter into the crotch 65. After this occurs, the noses of the latch plates will be clear and the plates will move together under the influence of the respective springs 68 to thereby trap the stem in the crotch 65. At this point, the user may manually grasp the actuator 20 thereby causing the cutter mechanism to sever the stem trapped in the crotch 65.

The above described embodiment has the advantage of requiring only one manual operation, namely an operation to actuate the cutter mechanism. Of course it is also possible to include with the head 60 a pair of fingers like those shown at 14 and 15 in connection with head 10, and/or incorporate the flaps 50 in the modification shown in FIG. 5. In order to accommodate fruit of different sizes having stems of various thicknesses the width of slot 64 may be adjustable by means of movable strips adjustably mounted on the cover plate 61., which strips define the slot 64.

A plurality of cutter heads like either of those indicated by reference numerals 10 and 60, for example, can be aligned in a row on a single support rod to facilitate picking a plurality of pieces of fruit simultaneously. Preferably, each head would be individually telescopically mounted on the support rod and would be capable of limited vertical movement, being urged by a suitable spring toward a fully extended position. The resultant rake-like device is used by hoisting the device into a tree containing many pieces of fruit growing at various levels. By successively moving the support rod upwardly and downwardly, each head will capture a piece of fruit, the elevation of a head in its telescopic mounting adjusting automatically to the level of the captured piece of fruit regardless of the elevation of other pieces of fruit captured by the other heads.

The above described rake-like device is ideally suited for a cutter head like that shown by reference numeral 60, although other types of heads could be used of course. With a plurality of heads 60, a single stem cutter actuating mechanism would be provided on the support rod, such mechanism being connected to the stem cutters on the plurality of heads. Thus, after the capture of many pieces of fruit, simultaneous severing of the stems of the captured fruit can take place by operating the actuating mechanism.

In a further embodiment, the telescopic mountings for the head are not rigidly connected to the support rod as was the case with the above described embodiment. Rather, the telescopic mountings are pivotally connected to the support rod at an axial position above the centre of gravity of the mounting. This permits each mounting to tilt about the pivotal connection thus facilitating capture of the various pieces of fruit. Because of the pendulum-like operation of the telescopic mountings, an automatic return of the mounting to a stable vertical position is assured.

Figure 7:
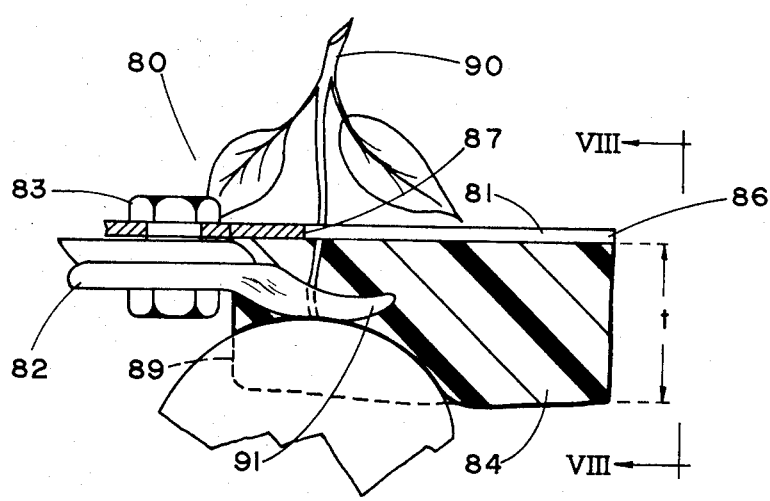
FIG. 7 is a side view of a third embodiment of the invention in which the fingers holding the fruit in proper position are in the form of resilient pads.
Figure 8:
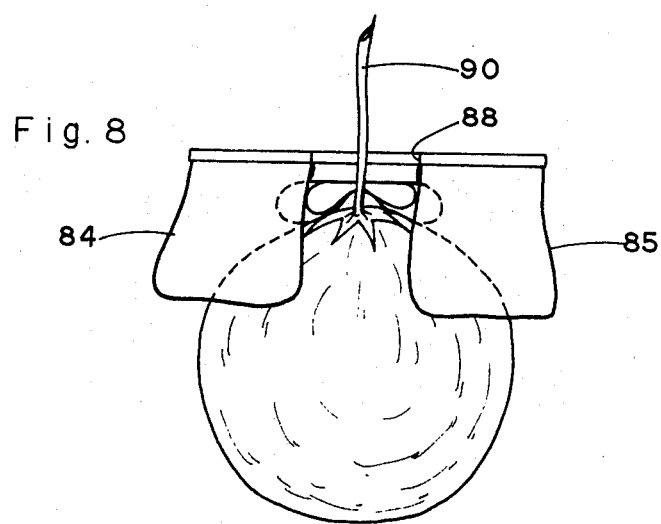
FIG. 8 is a view taken along the line VIII—VIII of FIG. 7.

In the third embodiment of the invention shown in FIGS. 7 and 8, the cooperable fingers are in the form of a pair of resilient pads. Thus, head 80 comprises a top cover plate 81 attachable to a rod (not shown) as in the case of the previous two embodiments, a cutter mechanism 82 attached by fastener 83 to the underside of the cover plate, and a pair of resilient pads 84 and 85 adhesively attached to the underside of the cover plate on respective sides of central slot 88.

Cutter mechanism 82 is substantially the same as mechanism 18 shown in FIGS. 2 and 4, and fastener 83 cooperates with the cutter mechanism like fastener 39 shown previously cooperates with mechanism 18. A suitable cutter operator (not shown) like that shown at 19, can be used to actuate the cutter mechanism.

The free end 86 of the plate 81 is somewhat reduced than the free end 72 of head 60 to provide a support for the pads 84 and 85 which are preferably foamed polyurethane but which may also be foam rubber or the like. In general, the pads are resiliently deformed by a piece of fruit captured in the crotch 87 of the plate at the closed end of slot 88 when an operator exerts a downward pull on the head. Since the pad terminates at face 89 located slightly to the rear of crotch 87, the resilient deformation of the pads causes them to press the fruit inwardly and urge the stem 90 into the crotch 87. Once captured in the crotch, the stem can be severed in the conventional manner by actuation of the cutter mechanism operator.

The advantage of the use of resilient pads, rather than the fingers 14 and 15 of head 10, or the fingers 62 and 63 of head 60, is the simplicity of construction and ease of operation. First of all, no actuating mechanism is required to cause the stem of a captured piece of fruit to be urged into the crotch as in the case of head 10. Secondly, no moving parts are involved as in the case of head 60. Even when a single finger is used with head 60 in order to simplify its construction, the resultant device is not as simple as head 80. For this reason, the embodiment of FIGS. 7 and 8 has many advantages over the other embodiments. In addition, however, it is possible for head 80 to be adjusted easily for controlling the point of the stem at which it is severed. For apples and oranges, stems should be severed close to the bodies of the fruit, and the curved lower end 91 of the cutter mechanism is ideal for this purpose. When picking pears, however, the tapered end of the fruit adjacent the stem will often be caught between the cutter bars of the cutter mechanism damaging the fruit. To solve this problem, the thickness of pads t can be made great enough when picking pears that the body of the fruit is kept below the action line of the cutter mechanism.

Figure 9:
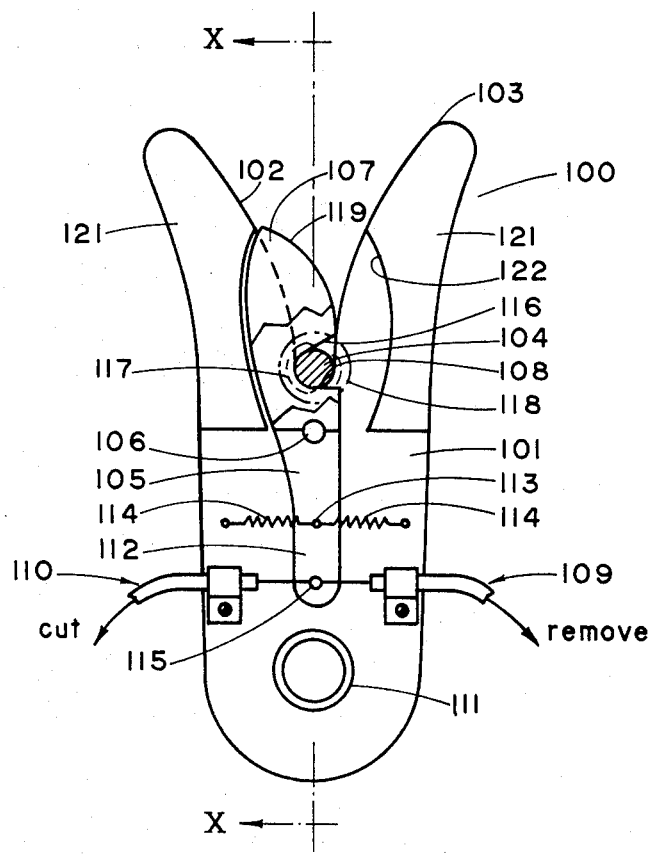
FIG. 9 is a bottom plan view of a fourth embodiment of the invention in which the finger that traps the stem in the crotch of the slot also serves as a part of the stem cutter.
Figure 10:
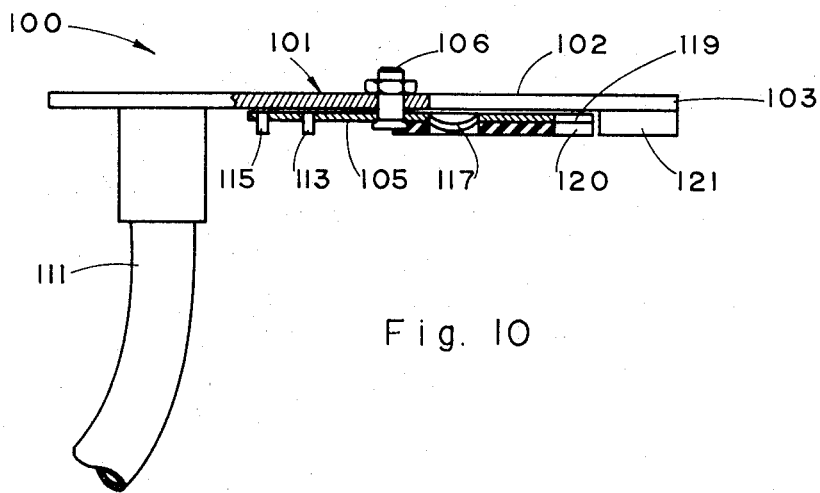
FIG. 10 is a sectional view taken along the line X—X of FIG. 9.

In the fourth embodiment of the invention shown in FIGS. 9–10, the stem pushing and cutting operations are achieved by combining the cutter into the finger. Thus, head 100 includes a base plate 101 attached to an elongated rod 111 and having a guide slot 102 that opens at the unsupported end 103 of the plate and is adapted to receive the stem 104 of a piece of fruit growing on a tree. Head 100 also includes a finger 105 pivotally mounted by pin 106 attached to plate 101. Finger 105 has a tail portion 112 carrying a pin 113 to which one end of each of two centering springs 114 is attached, the other ends of these springs being respectively attached to pins carried by the plate 101. The centering springs 114 serve to establish a neutral position of the finger 105 in the absence of any manual input to the flexible cables 109 and 110 each of which are connected to pin 115 on the tail portion of the finger.

Opposite the tail portion, is a nose portion 107 on the finger which overlies the slot 102 when the finger is in the neutral position shown in FIG. 9. The nose portion is notched on one side, as shown by reference numeral 116, in such a way that the notch serves to trap the step 104 in the crotch 108 of the slot 102 when the finger is in its neutral position which is also termed the blocking position of the finger. As indicated in FIG. 9, notch 116 has an inclined edge which causes the stem to be cammed inwardly towards the crotch 108 upon the actuation of the means 110 which constitutes a selectively operable finger actuating mechanism. Upon operation of the means 110, the finger 105 will pivot clockwise as shown in FIG. 9 causing the cutter bar 117 surrounding the notch 116 to slice through the stem 104 which is held against cutter bar 118 constituting a part of the crotch 108.

The finger 105 is also provided with means by which it can be moved from blocking to unblocking position in the form of a cam surface 119 on the nose portion 107. Surface 119 engages a stem upon relative movement between the stem and the plate when the stem is in the slot 102 causing the finger to pivot against the resilient bins of springs 114 from a blocking to unblocking a position and allowing the stem to reach the crotch 108. After this occurs, the centering springs 114, become effective to return the finger to its blocking position causing the stem to be trapped in the crotch.

The dish-shaped cutter bar 117 bulges outwardly away from the plate as indicated in FIG. 10 for enabling the cutter to sever the stem of a piece of fruit adjacent the body thereof. The bottom of the finger may be provided with a resilient foam pad 120 of a thickness approximately equal to the depth of the dish-shaped cutter bar 117 for the purpose of providing a resilient cushion that prevents the finger from bruising the fruit during the cutting process. The under surfaces of the plate on each side of the slot 102 may also be provided with a resilient foam material 121 to project the fruit. The clearance space 122 in material 121 accomodating finger 105 may be filled by a foam pad slidably mounted on the under surface of plate 103 and movable when finger 105 moves.

In operation, a user grasps the rod 111 in order to project the cutter head 100 into a fruit tree for the purpose of engaging a stem in the slot 102. Movement of the cutter head relative to the stem causes the latter to engage the cam surface 119 thus, pivoting the finger to its unblocking position and eventually causing the stem to be trapped in the crotch 108. Manual operation of the finger actuating mechanism causes the inclined surface of notch 116 to cam the stem into the crotch as the cutter bar 117 becomes effective to sever the stem.

In order to provide for the removal of a branch or twig accidentally captured in the crotch 108, a second selectively operable finger actuator 109 may be provided. Operation of this actuator causes the finger 105 to pivot from a blocking to unblocking position thereby releasing a twig or branch accidentally captured in the crotch.

I claim:

1. A cutter head for picking fruit growing on a tree comprising a base plate adapted to be supported on one end of an elongated rod and having a guide slot that opens at the unsupported end of the plate and is adapted to receive the stem of a piece of fruit growing on a tree, means on said base plate for urging a stem in the slot toward the crotch thereof, a cutter mounted on the plate having a pair of cutter bars positioned adjacent the crotch of the slot, and a selectively operable cutter actuating mechanism for imparting relative movement to the cutter bars thereby severing a stem captured in the crotch.

2. A cutter head according to claim 1, wherein the means for urging a stem in the slot toward the crotch thereof includes at least one finger pivotally mounted on the plate for movement from an unblocking position relative to the slot effecting entry of a stem thereinto, to a blocking position trapping the stem in the crotch, and the cutter head further includes means for moving the finger from blocking to unblocking position, and means for moving the finger from unblocking to blocking position.

3. A cutter head according to claim 2, wherein the means for moving the finger from blocking to unblocking position includes a cam portion on the finger projecting into the slot when the finger is in blocking position and engageable with a stem upon relative movement between the stem and the plate when the stem is in the slot for pivoting the finger to unblocking position and effecting passage of the stem into the crotch, and wherein the means for moving the finger from unblocking to blocking position includes a spring resiliently urging the finger to its blocking position.

4. A cutter head according to claim 2 wherein one cutter bar is on the finger and the other cutter bar is on the plate.

5. A cutter head according to claim 4, wherein the finger is pivotally mounted on one side of the plate, and the cutter bar on the finger bulges outwardly away from the plate for enabling the stem of a pice of fruit to be cut adjacent the body thereof.

6. A cutter head according to claim 1, wherein the means for moving the finger from blocking to unblocking position includes a selectively operable finger actuator.

7. A cutter head according to claim 2, wherein the means for moving the finger from unblocking to blocking position includes a selectively operable finger actuating mechanism for pushing a stem in the slot into the crotch.

8. A cutter head according to claim 2, wherein the finger is pivotally mounted on the base plate and has a first position at which its free end clears the slot and a second position at which the finger crosses the slot.

9. A cutter head according to claim 2, including a cover plate in overlying relationship to the base plate, the fingers and the cutter being contained between the cover plate and the base plate.

10. A cutter head according to claim 7, including flaps pivotally connected on the unsupported end of the base plate on each side of the slot, and means connecting the flaps to the finger actuating mechanism for moving the flaps downwardly simultaneously with moving the finger toward the crotch.

11. A cutter head according to claim 1, wherein the means for urging a stem in the slot toward the crotch thereof includes resilient blocks of foam material on each side of the slot.

* * * * *